(12) United States Patent
Vemulapati et al.

(10) Patent No.: US 11,667,237 B1
(45) Date of Patent: Jun. 6, 2023

(54) VANITY MIRROR ASSEMBLY

(71) Applicant: Ford Global Technologies, LLC, Dearborn, MI (US)

(72) Inventors: Satyanarayana Raju Vemulapati, Westland, MI (US); Jedidiah Paul Durkin, Detroit, MI (US); Jason Robert Emrich, Sterling Heights, MI (US); Steven J. Antilla, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/676,393

(22) Filed: Feb. 21, 2022

(51) Int. Cl.
*B60Q 3/252* (2017.01)
*B60Q 3/64* (2017.01)
*B60Q 3/80* (2017.01)
*B60J 3/02* (2006.01)

(52) U.S. Cl.
CPC ............ *B60Q 3/252* (2017.02); *B60J 3/0282* (2013.01); *B60Q 3/64* (2017.02); *B60Q 3/80* (2017.02)

(58) Field of Classification Search
CPC ............ B60Q 3/252; B60Q 3/64; B60Q 3/80; B60J 3/0282
See application file for complete search history.

(56) References Cited

U.S. PATENT DOCUMENTS

| | | | | |
|---|---|---|---|---|
| 4,792,884 A * | 12/1988 | Suman | ................ | G02B 6/0038 362/135 |
| 5,184,888 A * | 2/1993 | Sakuma | ................ | B60J 3/0282 362/330 |
| 5,473,516 A * | 12/1995 | Van Order | ............ | B60Q 3/252 362/135 |
| 5,906,424 A * | 5/1999 | Peterson | ................ | B60J 3/0282 362/135 |
| 9,150,157 B1 | 10/2015 | Pendlebury | | |
| 10,737,614 B2 | 8/2020 | Holland et al. | | |
| 11,077,789 B2 | 8/2021 | Janowiak et al. | | |
| 11,220,210 B1 | 1/2022 | Chen | | |
| 2006/0181893 A1* | 8/2006 | Fernandez | ............... | B60Q 3/59 362/494 |
| 2006/0198123 A1* | 9/2006 | Radu | ..................... | B60Q 3/252 362/135 |
| 2015/0360605 A1* | 12/2015 | Lanser | ..................... | B60Q 3/64 362/546 |

* cited by examiner

*Primary Examiner* — Anabel Ton
(74) *Attorney, Agent, or Firm* — Vichit Chea; Price Heneveld LLP

(57) ABSTRACT

A vanity mirror assembly for a vehicle visor includes a housing having a support structure and a channel on a top side, a mirror connected to the support structure, and a light source disposed proximate the channel and operative to illuminate visible light. The vanity mirror assembly also includes at least one lens provided on the housing on at least one side of the mirror and operatively coupled to the light source, the at least one lens comprising a transparent optical element configured to refract the visible light from a front face of the at least one lens.

19 Claims, 5 Drawing Sheets

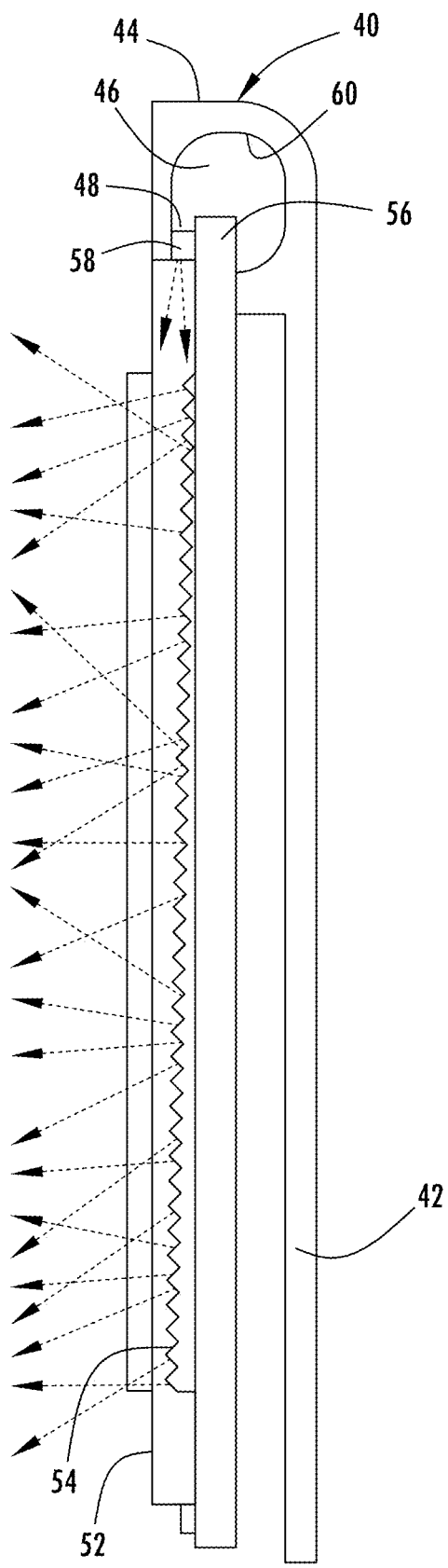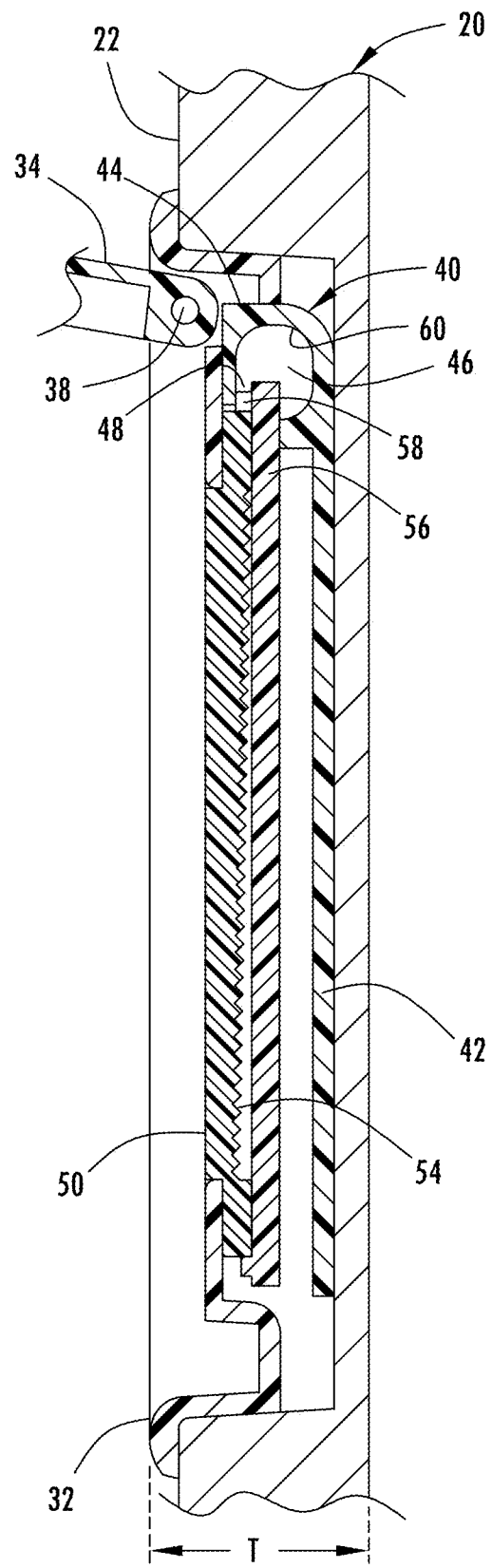
FIG. 4
FIG. 5

VANITY MIRROR ASSEMBLY

FIELD OF THE DISCLOSURE

The present disclosure generally relates to vanity mirror assembly for an automotive sun visor in a vehicle interior, and more particularly relates to an illuminated mirror assembly having a thin profile.

BACKGROUND OF THE DISCLOSURE

Automotive vehicles are commonly equipped with sun visors that are generally connected to the roof or headliner forward of the driver and front passenger seats. Each visor is typically connected via a pivot mechanism that may be actuatable between stowed and deployed positions to provide shade from sunlight. The conventional visor typically includes a vanity mirror assembly installed on one side of the visor body. Generally, the vanity mirror assembly includes a mirror and one or more vanity lights to provide lighting sufficient to enable a user to view a reflected image in the mirror. It may be desirable to provide for a relatively thin modular visor vanity mirror assembly.

SUMMARY OF THE DISCLOSURE

According to a first aspect of the present disclosure, a vanity mirror assembly is provided. The vanity mirror assembly includes a housing having a support structure and a channel on a top side, a mirror connected to the support structure, and a light source disposed in or proximate to the channel and operative to generate visible light. The vanity mirror assembly also includes at least one lens provided on the housing on at least one side of the mirror and having an edge operatively coupled to the light source to receive the visible light, the at least one lens comprising a transparent optical element configured to refract the visible light outward from a front side of the at least one lens.

Embodiments of the first aspect of the disclosure can include any one or a combination of the following features:
- the transparent optical element comprises one or more prisms;
- the transparent optical element comprises a series of prisms;
- the series of prisms has a series of grooves formed in a surface of each of the at least one lens;
- the light source comprises at least one light emitting diode (LED) operatively coupled to the edge of the lens;
- the light emitting diode is located on a circuit board;
- the light source comprises a lightbulb;
- the lightbulb is disposed in the channel to radiate the visible light through an opening in the channel and onto an edge of the at least one lens;
- the vanity mirror assembly is a modular vanity assembly configured to receive a light source in the form of either an LED or a lightbulb;
- the at least one lens comprises a first illuminable lens on one side of the mirror and a second illuminable lens on an opposite side of the mirror;
- the mirror and lens are integrally formed in a common body; and
- the vanity mirror assembly is assembled onto a sun visor on a vehicle.

According to a second aspect of the present disclosure, a modular vanity mirror assembly for a vehicle visor is provided. The modular vanity mirror assembly includes a housing having a support structure and a channel on a top side, a mirror connected to the support structure, and a light source disposed in the channel or proximate the channel and operative to generate visible light. The modular vanity mirror assembly also includes at least one lens integrally formed with the mirror and disposed on the housing on at least one side of the mirror and having an edge operatively coupled to the light source to receive the visible light, the at least one lens comprising a series of prisms configured to refract the visible light outward from a front side of the at least one lens.

Embodiments of the second aspect of the disclosure can include any one or a combination of the following features:
- the light source comprises at least one light-emitting diode (LED);
- the light emitting diode is located on a circuit board;
- the light source comprises a lightbulb;
- the lightbulb is disposed in the channel to radiate the visible light through an opening in the channel;
- the lens comprises a light transmissive medium, and wherein the series of prisms has series of grooves formed in a surface of the lens;
- the modular vanity mirror assembly is employed on a vehicle; and
- the at least one lens comprises a first illuminable lens on one side of the mirror and a second illuminable lens on an opposite side of the mirror.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a schematic side view of the vanity mirror assembly using a light-emitting diode (LED) as the light source;

FIG. 5 is a cross-sectional view of the visor assembly and vanity mirror assembly with the LED taken through lines V-V of FIG. 1;

DETAILED DESCRIPTION OF THE PREFERRED EMBODIMENTS

Figure 1:
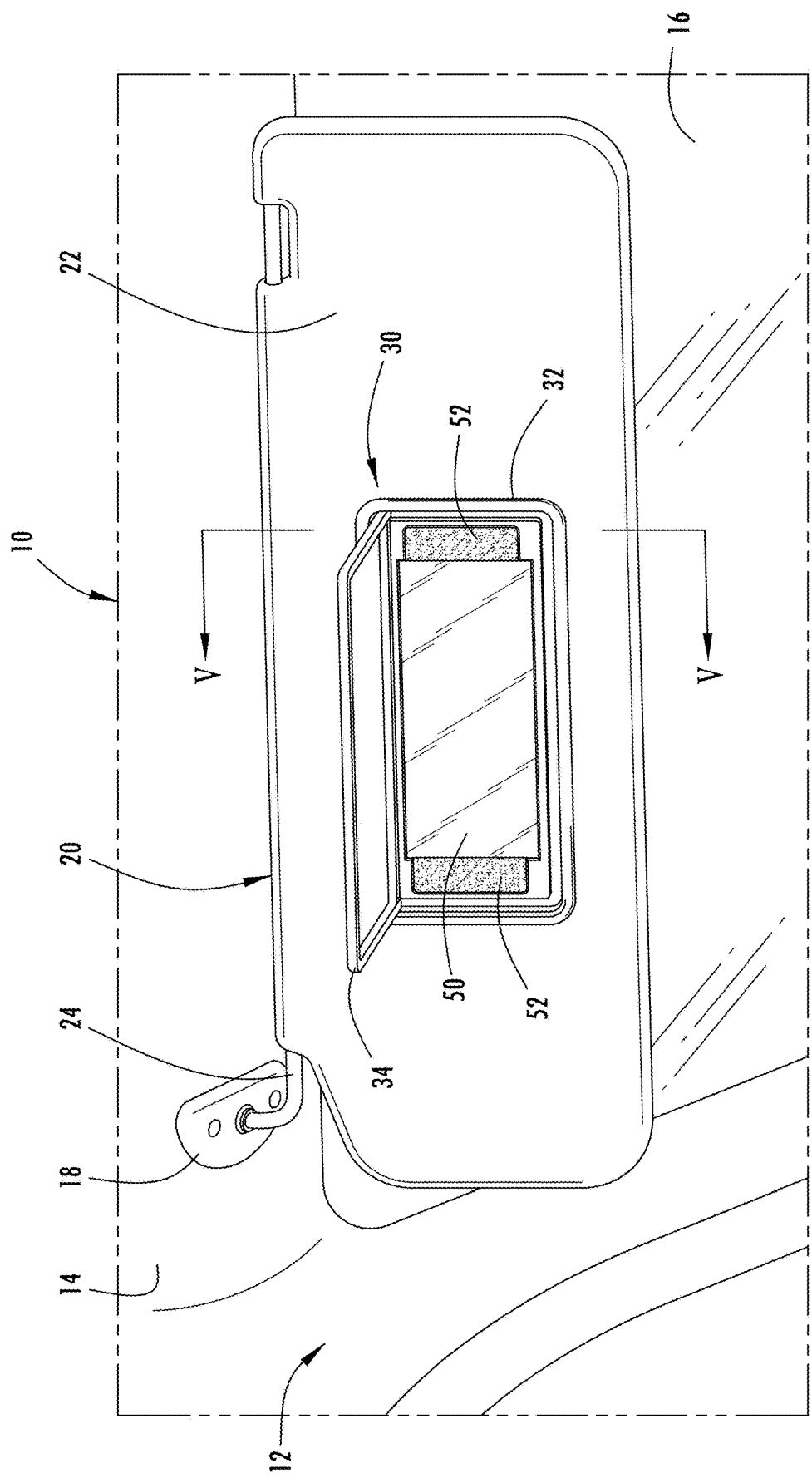
FIG. 1 is a perspective view of a passenger compartment of a vehicle equipped with a sun visor assembly having a modular vanity mirror assembly, according to one embodiment.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a modular vanity mirror assembly particularly for use on a vehicle visor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a vehicle 10 is generally illustrated having a visor assembly 20 connected to a roof mounted headliner 14 in the cabin interior 12 which typically is forward of passenger seating in the vehicle 10. The vehicle 10 may include a motor vehicle for transporting passengers as is commonly known in the art. The visor assembly 20 is generally positioned rearward of a front windshield 16 and is shown mounted to the headliner 14 via a visor mount 18. A user such as a seated driver or passenger may pivot the visor assembly 20 between a use position generally extending downward to shade sunlight from entering the vehicle through the windshield 16 and to allow access and use of a vanity mirror assembly 30 located on the front side of the visor assembly 20. The visor assembly 20 may be pivoted to an upward stowed position towards the headliner 14 which is referred to as a non-use position. The vehicle 10 may include the visor assembly 20 located forward of the driver's seat, forward of any passenger seat in the vehicle 10 or elsewhere on the vehicle to shade sunlight and provide access to the vanity mirror assembly 30.

The visor assembly 20 includes a shade panel or visor body 22 that defines a main body portion of the visor assembly 20. The visor assembly 20 may pivot about the visor mount 18 to a position towards a side of the vehicle 10. It is contemplated that more than two visor assemblies 20 may be included in the vehicle 10, and further the visor assembly 20 may be alternately oriented on the headliner 14 or other interior surfaces of the vehicle 10.

The visor assembly 20 is shown having an illuminated vanity mirror assembly 30 disposed on the visor body 22 on the front side of the visor body 22. The vanity mirror assembly 30 includes a frame 32 which may extended within a recess formed in the front side of the visor body 22. The frame 32 generally extends into and around the recess and supports a pivotable cover 34 connected on the top side. The cover 34 is shown in an open position which enables use of the vanity mirror assembly 30 and may pivot downward to a closed position to cover the front side of the vanity mirror assembly 30. It should be appreciated that other types of covers, such as sliding covers, may be employed to cover the vanity mirror assembly 30.

The vanity mirror assembly 30 includes a mirror 50 on the front side that has a reflective front surface to provide a vanity mirror. In addition, a pair of illuminable lenses 52 are provided on opposite left and right sides of the mirror 50. The lenses 52 each include a transparent optical element and are configured to receive visible light from a light source and refract the visible light outward from a front side of each lens 52. Accordingly, a user may view a reflection in the mirror 50 with the assistance of visible light illumination provided by the illuminated lenses 52. It should be appreciated that the light illumination may be turned on (activated) with a switch based on a position of the cover 34 in the open position and may turned off (deactivated) with the switch when the cover 34 is in the closed position. A separate manual operated switch may activate the light source.

Figure 2:
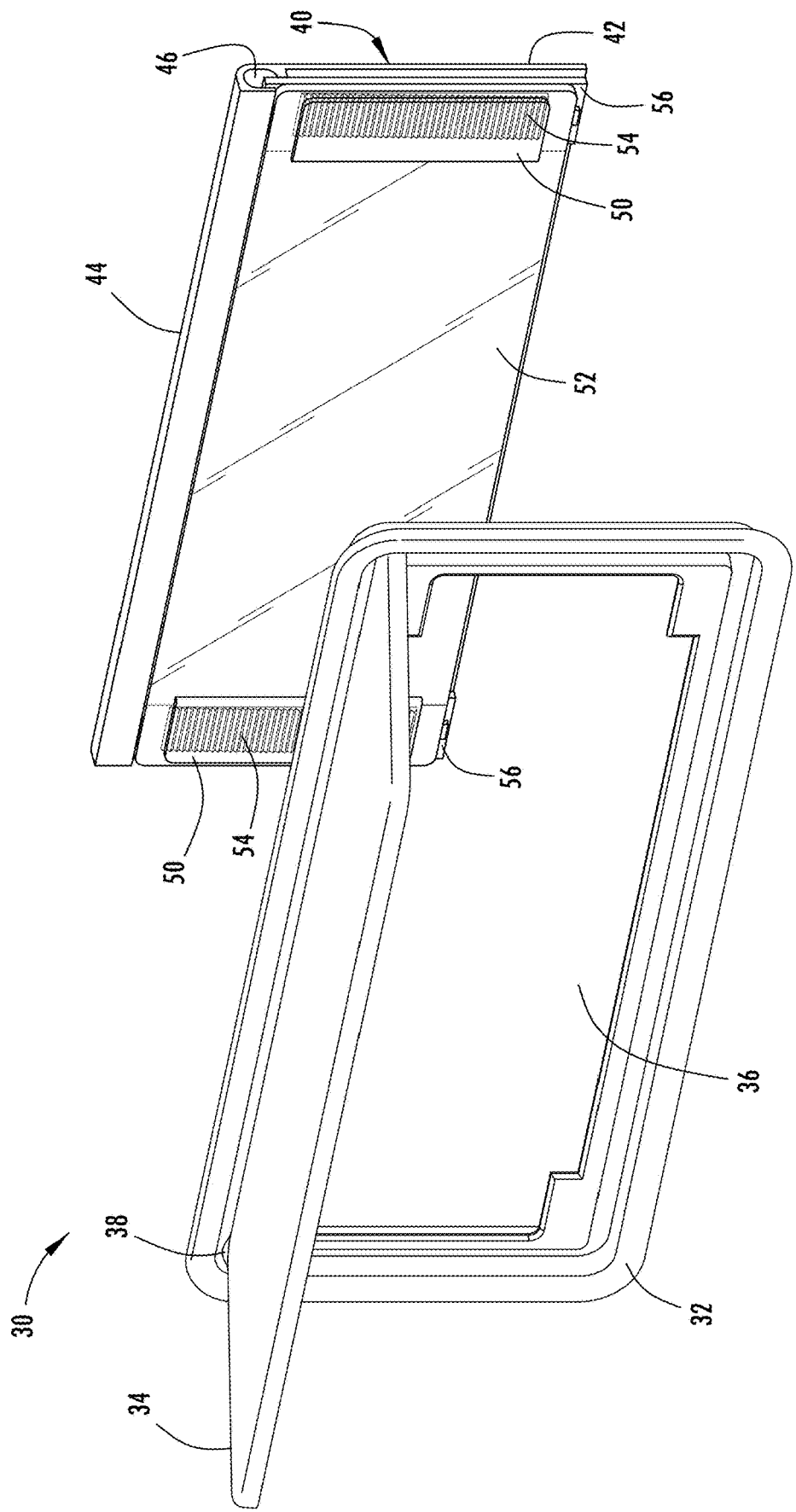
FIG. 2 is a partially exploded view of the modular vanity mirror assembly as shown in FIG. 1.
Figure 3:
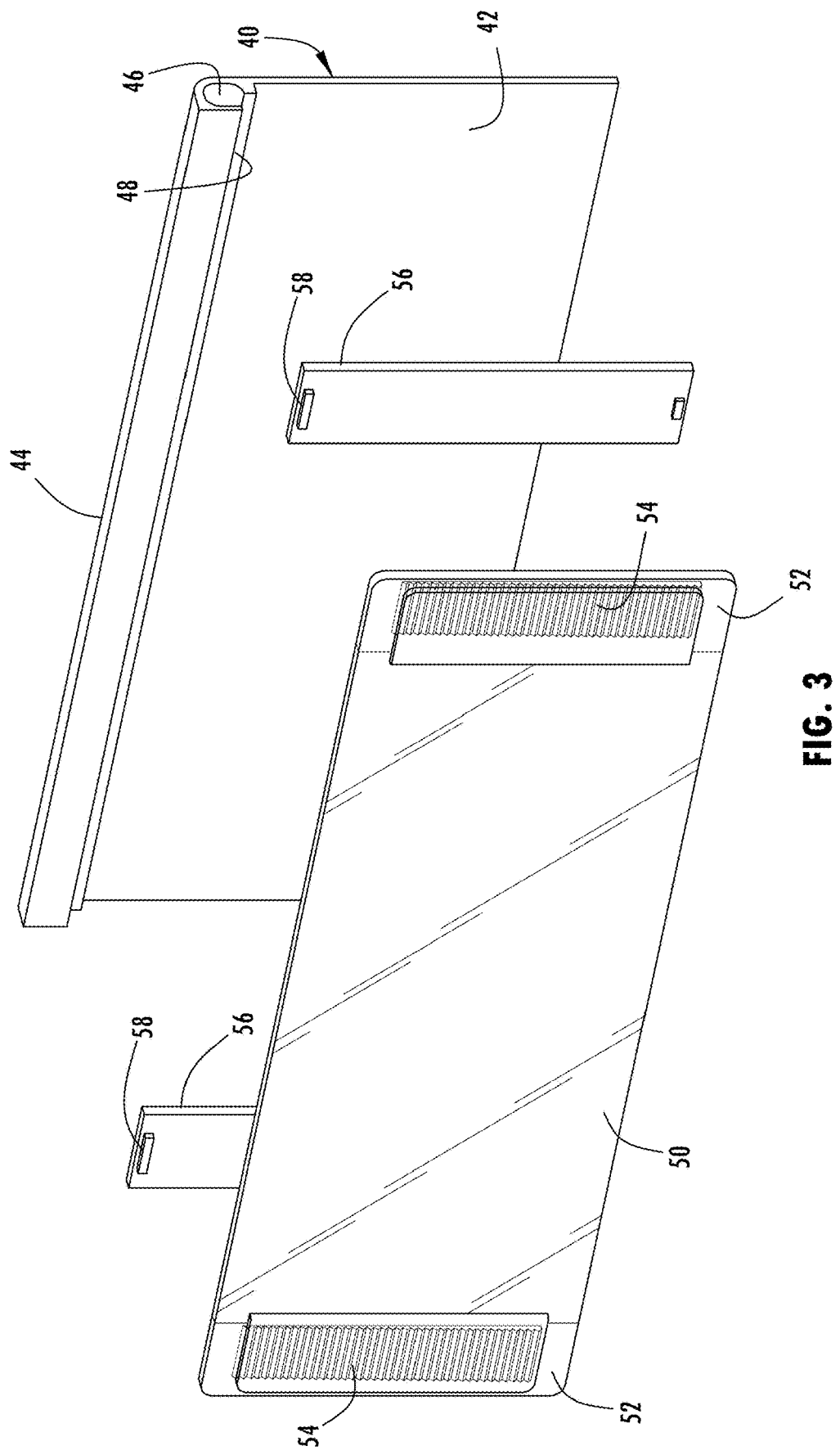
FIG. 3 is an exploded view of the vanity assembly showing the mirror and lenses with light illumination.

The vanity mirror assembly 30 is further illustrated in FIGS. 2 and 3. The vanity mirror assembly 30 includes a housing 40 generally disposed within an opening 36 of frame 32. The housing 40 includes a support structure 42 and a channel 46 at a top side 44 of the vanity mirror assembly 30. The support structure 42 is generally planar and configured to receive and support the mirror 50 and lenses 52. The channel 46 is integrally formed with the support structure 42 at a top end thereof and is configured as an elongated opening configured to receive a light source, such as a lightbulb. The channel 46 has a slot 48 on the lower side thereof that is operatively coupled to one or both of the lenses 52. The channel 46 and housing 40 may further include electrical circuitry to supply electric power to the light source such as from the vehicle battery. As such, a light source in the form of a lightbulb may be inserted into the channel 46 and activated to generate and radiate visible light downward through slot 48 and towards the top edge of lens 52. It should be appreciated that the inside surface of channel 46 may include a reflective material 60 to reflect the visible light illumination downward towards and through the slot 48 to the top edge of lens 52. As such, visible light illumination is illuminated onto the top edge of lens 52. It should be appreciated that a light source may be disposed at each of the left and right sides of the channel 46 to illuminate the left and right lenses 52 or a single light source may be inserted within the channel 46 to illuminate both the left and right lenses 52.

In addition, a circuit board in the form of a printed circuit board (PCB) 56 is shown positioned directly behind each of lenses 52. The printed circuit board 56 may include electrical circuitry for supplying from the vehicle batter power to the light source in the form of a light-emitting diode (LED) 58 which may be located proximate to channel 46 and oriented to illuminate the top edge of lens 52. As such, a light source in the form of a lightbulb or an LED may be advantageously employed in the modular vanity mirror assembly 30.

The mirror 50 and both illuminable lenses 52 are integrally formed in a common body, according to one embodiment. It should be appreciated that the lenses 52 may be formed as separate bodies positioned adjacent to the mirror 50 according to other embodiments. Each of lenses 52 includes a transparent optical element configured to refract the light received along the top edge and redirect the light each outward from a front face of each lens 52 as shown in FIG. 4. The transparent optical element is shown having at least one prism, and more particularly shown having a series of prisms 54 formed in a bottom surface of lens 52, according to one embodiment. The lens 52 may be made of a light transmissive medium operatively configured to receive visible light from the light source and to distribute the visible light through the front side of the lens 52. As such, lens 52 may operate as a light pipe to distribute the light to the prisms 54 which redirect the light via refraction.

The lens 52 may be made of a light transmissive medium having a high index of refraction, such as in the range of 1.4 to 1.7, according to one example. The light transmissive medium may include a transparent and rigid plastic, such as polymethylmethacrylate (PMMA), which is a synthetic resin produced from the polymerization of methacrylate and has an index of refraction of about 1.9, according to one specific example. According to another example, the light transmissive medium may include a thermoplastic polymeric, such as polycarbonate having an index of refraction of about 1.59, for example.

The illuminable lenses 52 and mirror 50 may be formed in a mold using injection molding. The lens 52 is formed to include the series of prisms 54 formed in the rear surface which generally extend in a periodic arrangement along a length of the lens 52. The series of prisms 54 may be integrally formed in the light transmissive medium during the injection molding process. By forming the series of prisms 54 in the lens 52, visible light distributed within the lens 52 may be refracted and directed in a pattern for emission from the front side of the lens 52. Each prism 54 is formed as a V-shaped groove or depression in the surface of the lens 52 and has a cross-sectional saw tooth shape with an incline angle in a range of 30-60°, for example. Each prism 54 is defined by a V-shaped groove having a depth and a length and may include a separation gap or no gap therebetween. The height of the series of prisms 54 may increase in size from the top side of the lens 52 towards the bottom side of the lens 52 to evenly distribute the light output across the front side of the lens 52.

As seen in FIGS. 4 and 5, the vanity mirror assembly 30 may employ an LED 58 on the circuit board as the light source which may illuminate the top edge of the lens 52 to transfer visible light throughout lens 52 to the series of prisms 54 to refract the visible light and direct the light rays forward from the front side of the lens 52. When the cover 34 is in the open position as shown in FIG. 5, the light source 58 may be activated to generate the light illumination.

Figure 6:
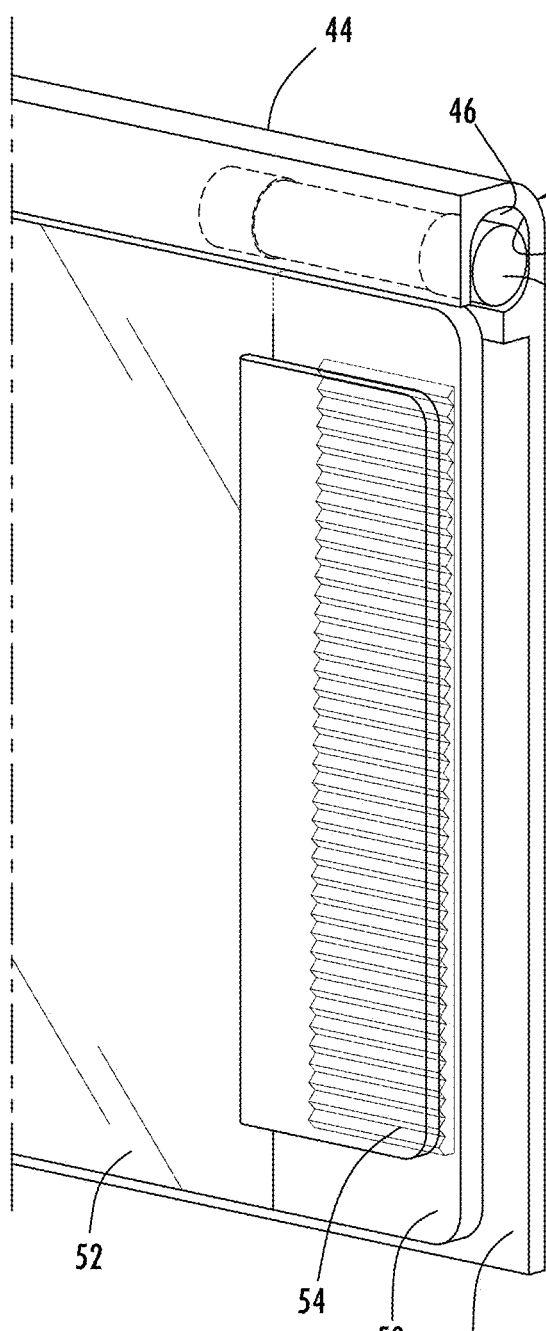
FIG. 6 is a side perspective view of the vanity mirror assembly using a lightbulb disposed in the channel as the light source.
Figure 7:
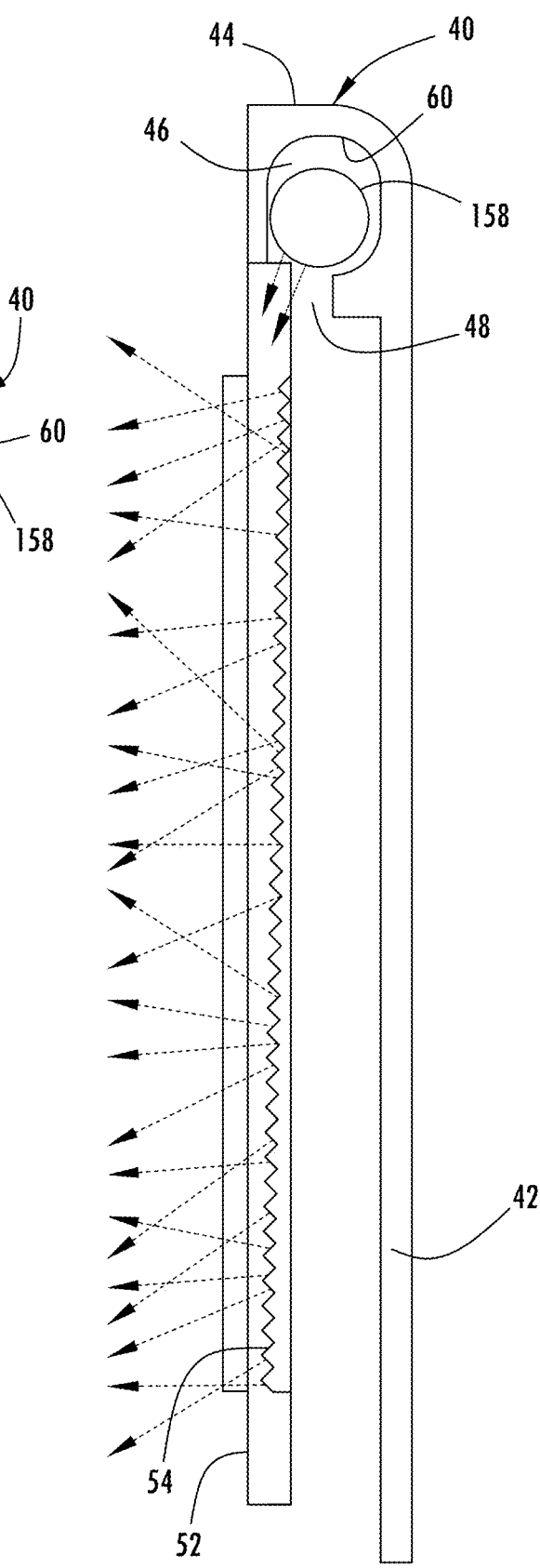
FIG. 7 is a schematic side view of the vanity mirror assembly with the lightbulb as shown in FIG. 6.

Referring to FIGS. 6 and 7, the vanity mirror assembly 30 may employ a light source in the form of a lightbulb 158 that may be inserted into the channel 46. The visible light illumination generated by the lightbulb 158 may be directed through the slot 48 onto the top edge of the lens 52. The reflective surface 60 within channel 46 may help direct the visible light through the slot 48 and onto the top edge of lens 52. Light illumination emitted from the lightbulb 158 is then transmitted throughout the lens 52 and is refracted forward of the front side via the series of prisms 54.

Accordingly, the vanity mirror assembly 30 is a modular assembly in that the vanity mirror assembly 30 is configured to receive either a lightbulb 158 or an LED 58 as the light source to provide light illumination for use with vanity mirror assembly 30. As such, the vanity mirror assembly 30 can accommodate different light sources. The series of prisms 54 are integrally formed in the lens 52 which may be formed as a single body with the mirror 50 and enables a low profile structure having an overall thickness T of less than 15 mm, and more particularly in the range of 12 to 14 mm, for example.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vanity mirror assembly comprising:
   a housing having a support structure and a channel on a top side of the housing that defines a hollow portion proximate to a top edge of the housing;
   a mirror connected to the support structure;
   a light source disposed in or proximate to the channel and operative to generate visible light; and
   at least one lens provided on the housing on at least one side of the mirror and having an edge operatively coupled to the light source to receive the visible light, the at least one lens comprising a transparent optical element configured to refract the visible light outward from a front side of the at least one lens, wherein the light source comprises at least one light-emitting diode (LED) operatively coupled to the edge of the lens.

2. The vanity mirror assembly of claim 1, wherein the transparent optical element comprises one or more prisms.

3. The vanity mirror assembly of claim 2, wherein the transparent optical element comprises a series of prisms.

4. The vanity mirror assembly of claim 3, wherein the series of prisms has a series of grooves formed in a surface of each of the at least one lens.

5. The vanity mirror assembly of claim 1, wherein the light emitting diode is located on a circuit board.

6. The vanity mirror assembly of claim 1, wherein the light source comprises a lightbulb.

7. A vanity mirror assembly comprising:
   a housing having a support structure and a channel on a top side of the housing that defines a hollow portion proximate to a top edge of the housing;
   a mirror connected to the support structure;
   a light source disposed in or proximate to the channel and operative to generate visible light; and
   at least one lens provided on the housing on at least one side of the mirror and having an edge operatively coupled to the light source to receive the visible light, the at least one lens comprising a transparent optical element configured to refract the visible light outward from a front side of the at least one lens, wherein the light source comprises a lightbulb, and wherein the lightbulb is disposed in the channel to radiate the visible light through an opening in the channel and onto the edge of the at least one lens.

8. The vanity mirror assembly of claim 1, wherein the vanity mirror assembly is a modular vanity assembly configured to receive a light source in the form of either an LED or a lightbulb.

9. The vanity mirror assembly of claim 1, wherein the at least one lens comprises a first illuminable lens on one side of the mirror and a second illuminable lens on an opposite side of the mirror.

10. A vanity mirror assembly comprising:
    a housing having a support structure and a channel on a top side of the housing that defines a hollow portion proximate to a top edge of the housing;
    a mirror connected to the support structure;
    a light source disposed in or proximate to the channel and operative to generate visible light; and
    at least one lens provided on the housing on at least one side of the mirror and having an edge operatively coupled to the light source to receive the visible light, the at least one lens comprising a transparent optical element configured to refract the visible light outward from a front side of the at least one lens, wherein the mirror and lens are integrally formed in a common body.

11. The vanity mirror assembly of claim 1, wherein the vanity mirror assembly is assembled onto a sun visor on a vehicle.

12. A modular vanity mirror assembly for a vehicle visor, the modular vanity mirror assembly comprising:
    a housing having a support structure and a channel on a top side of the housing that defines a hollow portion proximate to a top edge of the housing;
    a mirror connected to the support structure;
    a light source disposed in the channel or proximate the channel and operative to generate visible light; and
    at least one lens integrally formed with the mirror and disposed on the housing on at least one side of the mirror and having an edge operatively coupled to the light source to receive the visible light, the at least one lens comprising a series of prisms configured to refract the visible light outward from a front side of the at least one lens.

13. The modular vanity mirror assembly of claim 12, wherein the light source comprises at least one light emitting diode (LED).

14. The modular vanity mirror assembly of claim 13, wherein the light emitting diode is located on a circuit board.

15. The modular vanity mirror assembly of claim 12, wherein the light source comprises a lightbulb.

16. The modular vanity mirror assembly of claim 15, wherein the lightbulb is disposed in the channel to radiate the visible light through an opening in the channel.

17. The modular vanity mirror assembly of claim 12, wherein the lens comprises a light transmissive medium, and wherein the series of prisms has series of grooves formed in a surface of the lens.

18. The modular vanity mirror assembly of claim 12, wherein the modular vanity mirror assembly is employed on a vehicle.

19. The modular vanity mirror assembly of claim 12, wherein the at least one lens comprises a first illuminable lens on one side of the mirror and a second illuminable lens on an opposite side of the mirror.

* * * * *